United States Patent [19]

Wilkins

[11] 4,170,727
[45] Oct. 9, 1979

[54] THERMAL TORCH HEIGHT ACQUISITION CIRCUIT

[75] Inventor: Raymond Wilkins, Hanover, N.H.

[73] Assignee: Thermal Dynamics Corporation, West Lebanon, N.H.

[21] Appl. No.: 907,476

[22] Filed: May 19, 1978

[51] Int. Cl.² .............................................. B23K 9/10
[52] U.S. Cl. ............................ 219/121 P; 219/124.03
[58] Field of Search ........... 219/121 P, 124.02, 124.03

[56] References Cited

U.S. PATENT DOCUMENTS

| 2,832,000 | 4/1958 | Steele | 219/124.03 |
| 3,596,050 | 7/1971 | Tikijian | 219/124.03 |
| 3,809,308 | 5/1974 | Roeder et al. | 219/124.02 |
| 3,989,921 | 11/1976 | Ohi et al. | 219/124.03 |
| 4,017,707 | 4/1977 | Brown et al. | 219/121 P |

FOREIGN PATENT DOCUMENTS

1913126 11/1969 Fed. Rep. of Germany ........... 219/125

Primary Examiner—Gerald P. Tolin
Assistant Examiner—Clifford C. Shaw
Attorney, Agent, or Firm—Sughrue, Rothwell, Mion, Zinn and Macpeak

[57] ABSTRACT

A plasma torch circuit includes a control for initially setting the torch at a desired height above a workpiece during the time the non-transferred arc exists between the torch cathode and the torch tip. Measurement is made of the voltage between the cathode and the workpiece, and that voltage is compared to an input for controlling torch height. During transferred arc operation, a reference is initially created by storing the cathode-to-workpiece voltage occurring immediately after the transferred arc is turned on, and using the latter stored voltage as a reference for torch height maintenance.

13 Claims, 2 Drawing Figures

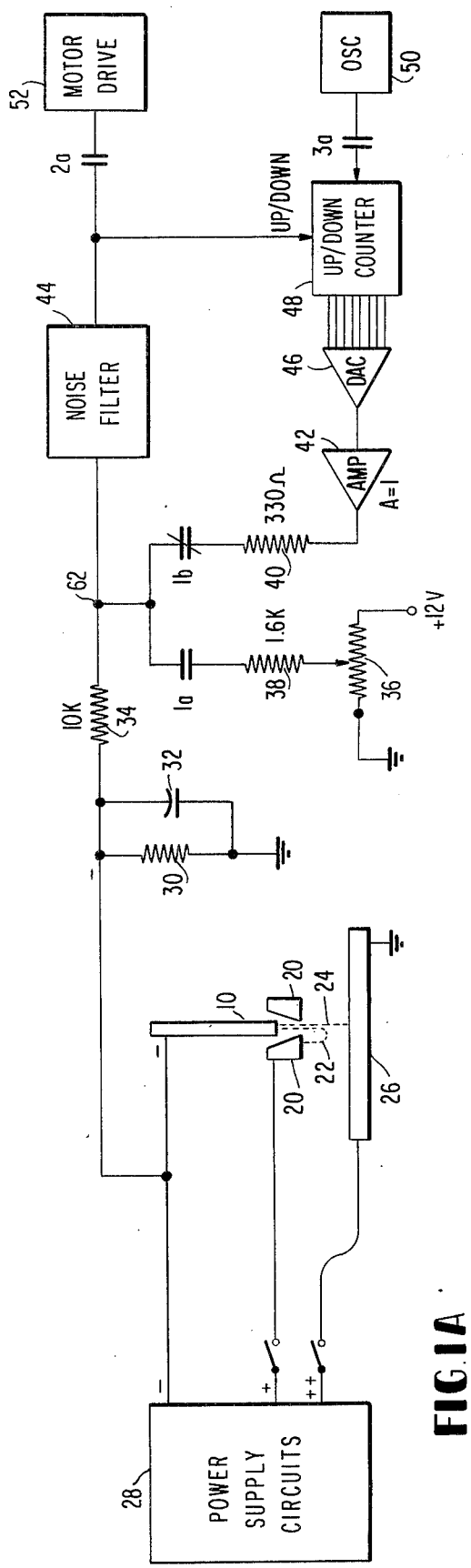
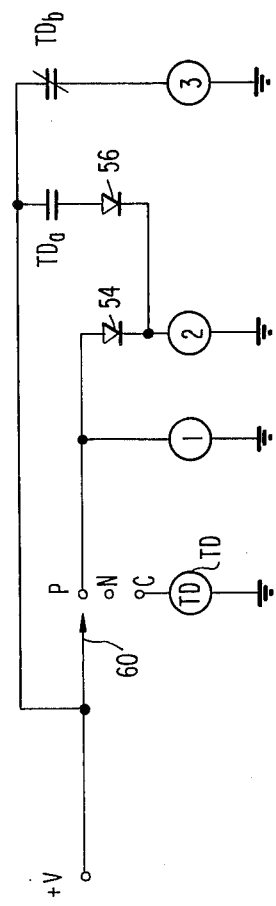
FIG.1A
FIG.1B

THERMAL TORCH HEIGHT ACQUISITION CIRCUIT

BACKGROUND OF THE INVENTION

The present invention is in the field of plasma torches, which are generally used for cutting, welding and spray bonding, and is specifically directed to a height acquisition and maintenance control system for such a torch.

Plasma torches, otherwise known as electric arc torches, are known in the art for performing operations, such as cutting, welding, etc., on workpieces, and operate by directing a plasma consisting of ionized gas particles towards a workpiece. An example of the conventional single gas plasma torch is illustrated in Hatch, U.S. Pat. No. 3,813,510, assigned to the assignee herein. As the latter patent illustrates, a gas to be ionized, such as nitrogen, is fed through channels in the torch mechanism in such a manner as to swirl in front of the end of a negatively-charged electrode. The welding tip which is adjacent the end of the electrode has a sufficiently high voltage applied thereto to cause a spark gap to jump between the electrode and the welding tip, thereby heating the gas and causing it to ionize. A pilot DC voltage between the electrode and the welding tip maintains an arc known as the pilot or non-transferred arc. The ionized gas in the gap appears as a flame and extends externally off the tip where it can be seen by the operator. The extension of the pilot arc and the flame, which for practical purposes may be considered as being co-extensive, depends upon the power in the gap, i.e., the arc current, as well as the pressure of the gas forced into the gap and out of the torch. The non-transferred arc provides a source of light which enables the operator to see the proper position for the torch before starting the welding or cutting operation. In actual practice, when the non-transferred arc is on, a loop-shaped arc extending out of the torch can be seen. As the torch head is brought down towards the workpiece, the arc jumps from the electrode to the workpiece due to the fact that the impedance of the workpiece current path is lower than the impedance of the welding tip current path.

The quality of the cut in the workpiece depends upon several variables, e.g., arc current, type of metal, thickness of metal, and torch height above the metal. For a given workpiece, the current and height are set to determine the quality of the cut. In the past, it has been conventional to set a plasma torch at the desired height, typically about ¼" above the workpiece, by manually pulling down the torch assembly and physically measuring the distance. Thereafter, the torch was held at this height during the entire cutting operation.

With the advent of numerical machine control of torch cutting patterns, it is not uncommon to have assemblies which are so large that it is impractical for the operator to initially manually adjust the torch height. The operator has to climb over the work table to make the adjustment.

Furthermore, there are several reasons why it is undesirable to fix the position of the torch and leave it at that position during the entire cutting sequence. For plasma torches, a nominal height above the workpiece, i.e., standoff, is ¼" with a permissible variation of ⅛". The work tables are not perfectly flat, and for very long workpieces, a small divergence from perfect flatness can create a significant difference in the standoff heights at the opposite ends of the workpiece. A warped workpiece compounds the problem. Also, there are cases where it is necessary to cut a corrugated workpiece. Traditionally, the height and arc current are set to cut through the valleys. However, this causes the cut in the peaks to be too wide.

In view of the above disadvantages of maintaining the torch at a fixed height position, there have been several attempts in the prior art to provide an apparatus for automatically controlling the torch height during the cutting operation to maintain the standoff height at a constant value. There have also been attempts to position the torch at a desired standoff height prior to cutting, welding or spray bonding, other than by the manual method mentioned above. However, these techniques and apparatus have not completely solved the above problems or have introduced problems of their own.

Both mechanical and electrical sensing devices have been used to maintain a fixed height above the workpiece once the torch is initially set. The mechanical sensing device uses one or more rollers attached to and extending downwardly and outward from the torch. The roller rides on the workpiece, and variations in height relative to the torch are sensed and fed to a torch height control motor. Problems with this technique are that the sensors are a finite distance away from the torch and, therefore, are not adequate for a workpiece such as corrugated metal, the sensors are bulky, and they become dirty from the cutting debris and can fail to operate. Also, if only a single sensor is used and placed in the direction of movement, it will give a false signal when the torch approaches the edge.

Capacitive and inductive sensors have also been proposed. These sensors are placed around the torch and sense a capacitive or inductive change as the distance between torch and workpiece changes. The capacitors or inductors are part of an oscillator which changes frequency in response to changes in capacitance or inductance. The frequency changes are detected and used to control the torch height control motor. Such sensors are bulky, and incorrect operation can result when cutting debris splashes onto the sensors. Also, electrical noise caused by the arc can interfere with the accuracy of operation, and heat from the arc can damage the sensors. A water shield, which surrounds the arc in many applications, can interfere with the correct operation of the sensors.

Arc voltage sensing during cutting and welding has also been used to maintain the torch at a fixed height above the workpiece. This technique is possible due to the fact that the arc voltage, which can be measured between the torch and the workpiece, is a function of several variables, including torch height above the workpiece, type and thickness of the metal workpiece, torch parts, horizontal travel speed, gas pressure and arc current. Since plasma torches include current regulators to regulate torch current, for a given workpiece, all variables, except torch height, can be and typically are kept constant. Thus, variations in the height above the workpiece can be measured by variations in the arc voltage, which is then used to control the torch height control motor.

While the latter system is an improvement over electrical and mechanical sensing, it only regulates height once it is properly set. The system cannot be used to regulate height until after the cutting arc has started and stabilized and a cut is made. This is because the arc voltage will have transients until the arc stabilizes and will not reach a final "regulating" value until a cut is made. Also, for any given cut, it is necessary to provide a reference arc voltage against which the actual arc voltage is compared. Thus, it must be determined a priori what arc voltage corresponds to the desired torch height above the work plate.

The set-up procedure for such a system can be based on arc voltage values taken from a manufacturer's table provided for that purpose, or can be based on the arc voltage observed during a test cut. The manual includes appropriate arc voltages for several torch heights, workpiece types, gas flow, etc. The operator would dial in the arc voltage as the reference voltage. A test cut should be used even if the manual is consulted to insure the accuracy of the reference arc voltage.

In either case, the torch height must initially be set using a ruler or a spacer block, or a gas back pressure system. The gas back pressure system initially sets the torch height by measuring the back pressure of the gas in the feed lines. While this method has proved useful, it is limited in its application and does not simplify the setting procedure for subsequent height regulation. It is limited to use with plasma torches that have a large diameter gas feed and do not have a restrictive orifice at the end of the torch. Thus, a substantial number of plasma torches cannot use this method.

The gas back pressure measuring system also cannot be used when either the non-transferred arc or transferred arc is on. This is because the arc varies the gas pressure and the cut would change the back pressure dramatically.

SUMMARY OF THE INVENTION

It is therefore an object of the present invention to provide an improved apparatus for initially setting the height of a torch above a workpiece.

It is a further object of the present invention to provide an improved torch height regulating apparatus for controlling the torch height during the cutting operation.

It is a further object of the invention to provide a torch height setting and regulating apparatus wherein the setting apparatus in cooperation with the regulating apparatus automatically determines the arc reference voltage for use during the cutting or welding operation.

The invention includes a voltage measuring system which measures a voltage that varies with torch height during the non-transferred arc operation. Applicant discovered the feature of a torch height dependent voltage during the non-transferred arc operation while attempting to create a small transferred arc, specifically for the purpose of initial torch height positioning. An RC circuit existed between the torch and the workpiece as part of the power supply. It was observed that when the power supply for the transferred arc was turned off, there existed a voltage between the torch and the workpiece that varied with changes in torch height.

According to the present invention, the torch height is set while the non-transferred arc is turned on. A voltage is created between the torch and workpiece due to the non-transferred arc electrically contacting the workpiece. The voltage increases as the torch moves closer. This voltage is compared with a manually set initial reference voltage that may be set on a dial calibrated in height steps. This is possible because the voltage measured during the non-transferred arc operation is not dependent on workpiece thickness or type, etc. A torch height control motor operates to raise or lower the torch in accordance with the results of the comparison. Once the initial height is set, the apparatus is switched to a cut or weld mode. The motor is momentarily disconnected to freeze the torch position, while a cutting or welding operation reference voltage is automatically calculated. The reference voltage is dependent upon the fixed height and the transferred arc voltage, the latter having been turned on.

The reference is stored and used as a reference for comparison with the arc voltage during the cutting operation to control the torch height control motor.

BRIEF DESCRIPTION OF THE DRAWING

FIG. 1A is a schematic drawing of a torch height initial setting and control circuit in accordance with the present invention.

FIG. 1B is a schematic drawing of a control circuit for controlling the switches of FIG. 1A.

DETAILED DESCRIPTION OF THE PREFERRED EMBODIMENTS

In the drawing, the torch cathode is shown at 10, the tip at 20, the workpiece at 26 and the power supply at 28. It will be understood by anyone of ordinary skill in the art that the torch and power supply are much more sophisticated than as shown in the simplified drawing. However, inasmuch as the latter parts are well known in the art and the details thereof are not necessary to an understanding of the invention, such details will not be described herein.

Also, as is well known, the torch is operated by firstly applying power between the cathode 10 and welding tip 20, thereby creating a non-transferred arc shown at 22. Thereafter, power is applied between the cathode and the workpiece, and if the torch is close enough, the arc transfers from the welding tip to the workpiece; thus, the name "transferred arc." The transferred arc is shown at 24. Gas is supplied in a well-known manner from a feed line in the torch assembly. The non-transferred arc does not cut the workpiece.

The torch height control circuit includes a resistor 30 and a capacitor 32 across which appears the so-called arc voltage. When the non-transferred arc is on and the torch is brought close enough to the workpiece 26, there will be a voltage across the RC network. It will be noted that the RC circuit can be dispensed with if the non-transferred arc is a continuous DC arc. However, the RC circuit permits proper operation when the arc is pulsed, and it is, therefore, preferable to have it in the circuit. The values of the RC circuit are not critical, except that the resistance should be large enough so that there is only a small current drain, and the time constant should be large enough to smooth the voltage for a pulsed arc. In a specific embodiment, R can be 2.5 K and C can be 3,000 $\mu$fd.

During non-transferred arc operation, as will be explained hereafter, the relay contacts 1a are closed and the relay contacts 1b are open. The circuit consisting of potentiometer 36, 1.6 K resistor 38 and the 10 K resistor 34 operates functionally as a comparator to compare the arc voltage with a reference set by manually adjustable potentiometer 36 and to provide an error voltage at node 62.

For a given type of torch, it can be assumed that the input arc voltage applied to resistor 34 is between 0 and 75 volts and is negative with respect to ground. The initial height reference voltage set by the potentiometer 36 which may be calibrated in inches or centimeters is between 0 and +12 volts and is applied to the 1.6 K resistor 38.

If the reference voltage is "balanced" by the arc voltage, there will be a null at node 62. Otherwise, there will be a positive or negative error voltage, depending on whether the torch is too high or too low relative to the reference level set in potentiometer 36. If, for example, the potentiometer is set to +6 volts, the torch will be moved up or down until the input voltage becomes −37 volts, at which point the error output voltage will be 0 volts.

The error output voltage is applied through a noise filter 44 and closed contacts 2a to a motor drive 52 which raises or lowers the torch in a direction to null the error voltage. The noise filter 44 may not be necessary but is preferable because it removes high frequency noise which can be picked up from the lead lines. The filter preferably has a cutoff frequency of 150 Hz and a gain of 1.

The manner in which the error signal output from noise filter 44 drives motor drive 52 depends upon the type of motor used. For a DC motor, since the speed varies with the DC amplitude of the input and the direction varies with the polarity of the input, direct application of the error voltage to the single input of the DC motor will correctly control the direction and speed such that the motor slows down as the torch approaches the correct height. This prevents overshoot.

For an AC motor, there are two input wire pairs, each adapted to receive a constant amplitude AC input, one pair for driving the motor in one direction and another pair for driving the motor in the opposite direction. In this case, conventional circuitry would be used to respond to the polarity of the error voltage to determine which pair of control wires receives the constant amplitude AC input. For speed control, another conventional circuit could be used to respond to the amplitude of the error voltage and thereby control the duty cycle of the latter AC signal.

When the error signal reaches 0 volts, the motor will stop with the torch being positioned at the correct height, as determined by the setting of potentiometer 36. The relay contacts 1a and 2a, previously described as being closed during the non-transferred arc operation, are controlled by the control circuit shown in FIG. 1B. There, a manual switch 60 is set to the terminal P for non-transferred arc operation. This connects the power supply voltage +V to the relay coils 1, 2 and 3, thereby causing contacts 1a, 2a and 3a to close and contacts 1b to open. It will also be noted that during this time, time delay relay TD will not be energized.

At this point in the operation, with the non-transferred arc on and the torch positioned at the desired height above the workpiece, the manual switch 60 is changed to position C, representing a cutting operation. Although not shown, switch position C may be ganged with the switch for applying the high voltage between the workpiece and the torch cathode, causing the transferred arc to occur and to start the cutting operation.

Immediately upon changing switch 60 to position C, relay TD has power applied thereto, relays 1 and 2 are cutoff and relay 3 remains energized. It is noted that the time delay relay TD has a delay of 1–2 seconds after power is applied before it affects its respective contacts $TD_a$ and $TD_b$. Thus, during this interim 1–2-second period, contacts 1a and 2a are open and contacts 1b and 3a are closed.

The opening of contacts 2a freezes the position of the torch until a new reference, suitable for use during the cutting operation, can be generated and stored. The closure of contacts 1b places in the circuit a new input resistor 40, an amplifier 42 having a gain of 1, a digital-to-analog converter 46 and an up/down counter 48. The counter 48 counts up or down, depending on the polarity of the error signal output from filter 44, the pulses applied thereto by oscillator 50 via closed contacts 48. The digital count held in counter 48 is converted to an analog voltage by digital-to-analog converter 46, and applied via unity gain amplifier 42 as one input to the comparator, consisting of resistors 40 and 34. The other input to the comparator is the arc voltage.

The counter varies its count to null the error signal at the comparator output 62. A time delay of 1–2 seconds is provided for this operation to allow the transferred arc to settle. It will be appreciated that since the torch is at the correct height relative to the workpiece, as determined during the non-transferred arc operation, when the transferred arc voltage settles, the arc voltage applied to comparator input resistor 34 is the arc voltage which should always appear during the subsequent operation provided the height is to remain constant. Since the feedback arrangement, including counter 48, has nulled the error voltage at this time, the input voltage to comparator input resistor 40 represents the correct cutting operation reference voltage needed to maintain the height at the initially set value. This cutting operation reference voltage is frozen at the end of the 1–2-second interim period by the operation of time delay relay TD. Contacts $TD_a$ will close, causing relay 2 to be energized. Contacts $TD_b$ will open, causing relay 3 to de-energize. The de-energization of relay 3 opens the contacts 3a, thereby blocking further counting pulses from altering the content of counter 48. Thus, the cutting operation reference voltage is stored in counter 48. The energization of relay 2 closes contacts 2a, thereby reconnecting the error signal to the motor drive. Thereafter, as the torch moves horizontally over the workpiece, variations in the torch height will be immediately sensed as an error signal output at 62, and the error signal output will control the motor, as in the pilot arc operation, to correct the height variation.

In FIG. 1B, the position N, designating neutral, for switch 60 may be used intermediate the positions P and C. Also, it will be apparent to anyone of ordinary skill in the art that the switching arrangement can be implemented by solid-state switches rather than using relays and relay contacts as shown. Also, the specific values given with respect to the drawings can be altered to conform to any specific embodiment of applicant's invention without departing from the teachings of applicant's invention.

With the above system, it no longer is necessary for the operator to climb onto the work table and measure the initial torch height. The desired torch height can be dialed into potentiometer 36, and the latter can be calibrated in inches or centimeters because the arc voltage input during the pilot arc operation is independent of workpiece type and thickness. Then, by the flick of a switch, the cutting operation can start, with a cutting operation reference voltage being automatically generated and stored corresponding to the initially set torch height.

While the invention has been described above in connection with a plasma cutting torch, it will be readily apparent that its use is not confined to a plasma cutting torch. It can also be used with a plasma welding torch and a plasma bonding spray torch. However, it should be noted that a plasma bonding spray torch only utilizes a non-transferred arc, i.e., a transferred arc is never created. In operation, the bonding spray torch melts a powder in the electric arc, and the melted powder is sprayed onto a workpiece. Obviously, only that part of the above system which operated during the non-transferred arc operation will be used for plasma bonding spray torches.

What is claimed is:

1. In a plasma torch system of the type wherein a non-transferred arc is generated between a torch cathode and torch tip, and wherein said system further comprises a motor for raising and lowering the torch height above a workpiece, the improvement comprising:
   comparator means having first and second inputs and an error signal output, said error signal output being connected to said motor for raising and lowering said torch relative to said workpiece depending upon the magnitude and polarity of said error signal output;
   variable control means for applying a selected initial height reference voltage to one input of said comparator; and
   means connecting to said second input of said comparator a voltage corresponding to the voltage between said torch cathode and said workpiece during the time when said non-transferred arc is generated, whereby the error output voltage will be nulled when the torch height above the workpiece is a value determined by said selected initial height reference voltage.

2. A plasma torch system as claimed in claim 1 further comprising means for applying to said one input of said comparator an operation reference voltage, and control means for selectively connecting to said one input either said initial height reference voltage or said operation reference voltage, whereby said control means is operable to connect the latter voltage to said one input during the time transferred arc is on.

3. A plasma torch system as claimed in claim 2 further comprising means for automatically generating said operation reference voltage, said latter means comprising variable voltage generating circuit means responsive to a control voltage applied thereto for providing an output voltage which increases and decreases, respectively, depending on the polarity of said control voltage, said error signal output from said comparator being connected as said control voltage to said variable voltage generating circuit means, and said output voltage constituting said operation reference voltage.

4. A plasma torch system as claimed in claim 3 wherein said control means further comprises means connected to said variable voltage generating means for freezing the output voltage therefrom irrespective of any further changes in said error voltage.

5. A plasma torch system as claimed in claim 4 wherein said control means further comprises means for selectively disconnecting said error signal from said motor, whereby operation of said latter means during the initial change-over from pilot arc to transferred arc permits said variable voltage generating circuit means to generate an operation reference voltage corresponding to the torch height above the workpiece initally set during the period the non-transferred arc was on.

6. A plasma torch system as claimed in claim 5 wherein said variable voltage generating circuit means comprises an oscillator for providing a source of counting pulses, an up/down counter having an up/down control input connected to receive said error voltage and a count input connected to receive said counting pulses, and a digital-to-analog converter means connected to said up/down counter for converting the count value in said counter into an analog voltage.

7. A plasma torch system as claimed in claim 6 wherein said means for freezing said output voltage comprises switch means for blocking said counting pulses from being applied to said up/down counter.

8. A plasma torch system as claimed in claim 5 wherein said comparator comprises first, second and third resistors, and an output node, said first resistor having one end connected to said output node and the other end serving as said second input of said comparator means, said second and third resistors each having their one ends connected to said node, the other end of said second resistor being connected to said variable control means, and the other end of said third resistor being connected to said variable voltage generating circuit means.

9. A plasma torch system as claimed in claim 8 wherein said control means for selectively connecting to said one input either said initial height reference voltage or said operation reference voltage comprises switch means for selectively electrically disconnecting either of said second or third resistors from said comparator means, wherein said other ends of said second and third resistors constitute selectively the one comparator input and said node constitutes said comparator output.

10. A plasma torch system as claimed in claim 9 wherein said variable voltage generating circuit means comprises an oscillator for providing a source of counting pulses, an up/down counter having an up/down control input connected to receive said error voltage and a count input connected to receive said counting pules, and a digital-to-analog converter means connected to said up/down counter for converting the count value in said counter into an analog voltage.

11. A plasma torch system as claimed in claim 10 wherein said means for freezing said output voltage comprises switch means for blocking said counting pulses from being applied to said up/down counter.

12. A plasma torch system as claimed in claim 9 wherein the improvement further comprises a parallel RC circuit connected between said torch electrode and said workpiece.

13. A plasma torch system as claimed in claim 9 wherein said variable control means is a potentiometer calibrated in torch height distance.

* * * * *